(12) United States Patent
Brockschmidt et al.

(10) Patent No.: US 10,902,972 B2
(45) Date of Patent: Jan. 26, 2021

(54) MATERIAL FOR INSULATION SYSTEM, INSULATION SYSTEM, EXTERNAL CORONA SHIELD AND AN ELECTRIC MACHINE

(71) Applicant: SIEMENS AKTIENGESELLSCHAFT, Munich (DE)

(72) Inventors: Mario Brockschmidt, Essen (DE); Peter Gröppel, Erlangen (DE); Friedhelm Pohlmann, Essen (DE); Claus Rohr, Mannheim (DE); Roland Röding, Ellrich (DE)

(73) Assignee: SIEMENS AKTIENGESELLSCHAFT

( * ) Notice: Subject to any disclaimer, the term of this patent is extended or adjusted under 35 U.S.C. 154(b) by 257 days.

(21) Appl. No.: 15/808,971

(22) Filed: Nov. 10, 2017

(65) Prior Publication Data

US 2018/0068757 A1 Mar. 8, 2018

Related U.S. Application Data

(63) Continuation of application No. 14/386,261, filed as application No. PCT/EP2013/053310 on Feb. 20, 2013, now abandoned.

(30) Foreign Application Priority Data

Mar. 26, 2012 (EP) .................................. 12161149

(51) Int. Cl.
*H01B 3/04* (2006.01)
*H01B 3/44* (2006.01)
(Continued)

(52) U.S. Cl.
CPC ............... *H01B 3/04* (2013.01); *H01B 1/125* (2013.01); *H01B 3/08* (2013.01); *H01B 3/445* (2013.01);
(Continued)

(58) Field of Classification Search
CPC . H01B 3/04; H01B 3/08; H01B 1/125; H01B 3/445; H02K 3/40;
(Continued)

(56) References Cited

U.S. PATENT DOCUMENTS 4,792,662 A 12/1988 Kitagaki
6,130,496 A 10/2000 Takigawa et al.
(Continued)

FOREIGN PATENT DOCUMENTS

CN 1223026 7/1999
EP 0 978 926 2/2000
(Continued)

OTHER PUBLICATIONS

International Search Report dated Aug. 8, 2013 issued in International Patent Application No. PCT/EP2013/053310.
(Continued)

*Primary Examiner* — Elizabeth C Imani
(74) *Attorney, Agent, or Firm* — Ostrolenk Faber LLP

(57) ABSTRACT

High-voltage insulation systems are simplified and can have a thinner design by the use of an external corona shielding system that may include an electrically conductive PTFE fabric. Thermal conductivity may also be improved.

9 Claims, 2 Drawing Sheets

(51) Int. Cl.
*H02K 3/40* (2006.01)
*H01B 1/12* (2006.01)
*H01B 3/08* (2006.01)

(52) U.S. Cl.
CPC ........ *H02K 3/40* (2013.01); *Y10T 428/24273* (2015.01); *Y10T 428/2913* (2015.01); *Y10T 442/10* (2015.04); *Y10T 442/2164* (2015.04); *Y10T 442/3976* (2015.04)

(58) Field of Classification Search
CPC ....... Y10T 428/24273; Y10T 428/2913; Y10T 442/2164; Y10T 442/3976; Y10T 442/10
See application file for complete search history.

(56) References Cited

U.S. PATENT DOCUMENTS

| | | | | |
|---|---|---|---|---|
| 6,140,733 | A * | 10/2000 | Wedde | H02K 3/345 310/196 |
| 6,210,789 | B1 | 4/2001 | Hanrahan | |
| 7,812,260 | B2 * | 10/2010 | Miller | C09J 7/04 174/120 R |
| 2009/0223701 | A1 | 9/2009 | Idomoto | |
| 2011/0109186 | A1 | 5/2011 | Baumann | |

FOREIGN PATENT DOCUMENTS

| | | |
|---|---|---|
| JP | 56121202 | 9/1981 |
| WO | WO 2006/117679 | 11/2006 |

OTHER PUBLICATIONS

Written Opinion dated Aug. 8, 2013 issued in International Patent Application No. PCT/EP2013/053310.
European Search Report dated Sep. 21, 2012 issued in European Patent Application No. 12161149.5.
Database WPI, Week 198145, Thomson Scientific, London, Great Britain, AN 1981-82346D.
Chinese Office Action dated Dec. 22, 2015 issued in Chinese Patent Application No. 201380017127.8 with an English language translation.

* cited by examiner

MATERIAL FOR INSULATION SYSTEM, INSULATION SYSTEM, EXTERNAL CORONA SHIELD AND AN ELECTRIC MACHINE

CROSS-REFERENCE TO RELATED APPLICATIONS

The present application is a continuation under 37 C.F.R. § 1.53(b) of prior U.S. patent application Ser. No. 14/386,261, filed Sep. 18, 2014 now abandoned, which is a 35 U.S.C. § 371 National Phase application based on PCT/EP2013/053310, filed Feb. 20, 2013, which claims priority of European Patent Application No. 12161149.5, filed Mar. 26, 2012. The PCT International Application was published in the German language. The contents of each of the patent applications above-listed are incorporated in full herein by reference.

TECHNICAL BACKGROUND

The invention related to a material for an insulation system, to an insulation system, to an external corona shielding and to an electrical machine.

Potential grading makes it possible in rotating machines, such as generators or high-voltage motors for example, to minimize electrical voltages (potential differences), as a result of which the occurrence of partial and/or corona discharges can be reduced or entirely avoided.

In rotating electrical machines, the reliability of the insulating system is decisively responsible for their operational reliability. The insulating system has the task of permanently insulating electrical conductors (wires, coils, bars) from one another and from the laminated stator core or the surroundings. The external potential grading has the task of establishing electrical contact between the laminated stator core which is at ground potential and the outer side of the main insulation. This ensures that no partial discharges occur in voids in the region of the boundary layer of the insulation and the laminated core.

A distinction must be made here between
external corona shielding (ECS) for generator winding bars which have been produced by single bar production (ECS-S) and
external corona shielding (ECS) for generator winding bars which have been produced by means of the GVPI process (ECS-G).

In the case of globally impregnated stator windings (Global Vacuum Pressure Impregnation GVPI), the entire laminated core with a fully fitted winding is impregnated and cured altogether. As a result, the adhesive bonding of the winding in the slots of the laminated core is so strong that the different coefficients of expansion of the copper, iron and insulation lead to high thermomechanical stresses between the copper, insulation and iron, which may lead to the boundary surfaces tearing apart after a certain number of thermal cycles (starts and stops of the generator). In order to prevent the gaps from being subject to a difference in electrical potential, and the partial discharges igniting there from destroying the insulation, an external potential grading (outer corona protection, OCP) is used, represented in FIG. 1 as double-layered external corona shielding, such as is used for the potential grading of machines processed by means of G-VPI. An insulating base winding 70 of fine-mica tape is applied over the current-carrying Roebel bar of copper conductor elements 40, said insulating base winding smoothing and increasing the edge radii of the thin copper conductor elements 40.

A first graphite-containing conductive nonwoven tape 100 is wound over said insulating base winding, said conductive nonwoven tape being connected to the high-voltage potential of the copper conductor element 40 by way of a contact strip 130 at only one point.

Only then is the main insulation 160 of fine-mica glass wound. Instead of the copper conductor components, the first conductive nonwoven tape 100 now forms the high-voltage electrode. It is permanently adhesively bonded to the main insulation.

Following on top of the main insulation 160 is the inner external corona shielding winding 110 which is composed of a material according to the prior art (conductive, flexible tape, in particular from Krempel), an outermost separating tape 190' and an outer external corona shielding winding 200. An external corona shielding tape 140, which is woven in the outermost separating tape 190', connects the inner external corona shielding winding 110 and the outer external corona shielding winding 200.

The thermomechanical stresses occurring between the copper conductor assembly and the insulation during the starting and stopping of the generator may after a certain operating time lead to instances of local detachment of the insulating sleeve from the conductor, without the feared partial discharges igniting in the gaps that are produced. The region of the delamination is potential-free, because the high-voltage potential has been transferred to the conductive nonwoven that becomes baked fast on the main insulation. This IPG design at the highly stressed inner boundary layer between the conductor and the insulation allows turbogenerators to be operated at peak load for decades without any notable aging due to partial discharge.

The object of the invention is therefore to solve the abovementioned problems.

The object is achieved by an insulation material, an insulation system, an external corona shielding and an electrical machine as disclosed herein.

Further advantageous measures that can be combined as desired with one another in order to achieve further advantages are listed in the dependent claims.

DESCRIPTION OF AN EMBODIMENT

The figures and the description represent only exemplary embodiments of the invention.

The invention involves using hydrophobic material, in particular PTFE (Teflon) as insulation, in particular for a high-voltage insulation system of this kind, wherein the insulation system is designed to be electrically conductive in the form of layers.

Figure 1:
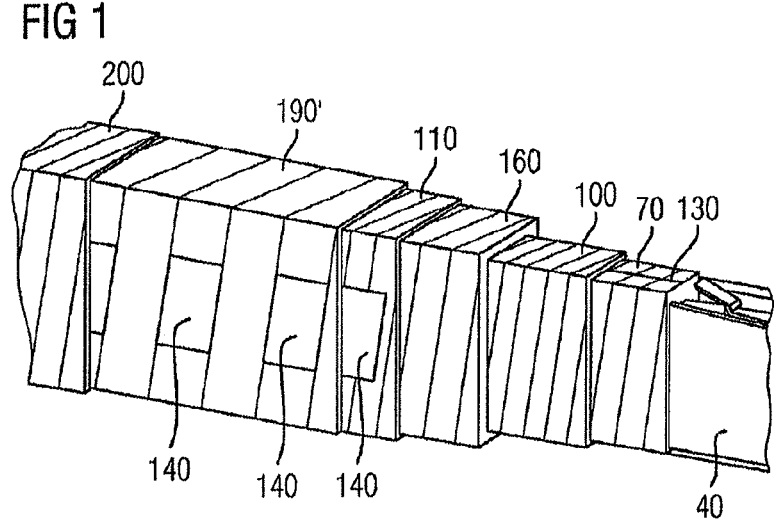
FIG. 1 shows an outer potential grading of a generator winding bar according to the prior art.

The high-voltage insulation system may be a simple system or a more complex system as in FIG. 1.

The invention is explained only on the basis of PTFE as an example of a hydrophobic material. Other hydrophobic materials may be used.

The hydrophobic material or PTFE is preferably already designed to be electrically conductive. The PTFE is then a composite material.

This preferably takes place during the production of the material, in particular by means of mixing in electrically conductive material, in particular graphite, for example by means of extrusion during production, with fibers then preferably being produced.

However, subsequent electrically conductive coating of a woven fabric, a fiber, a laid scrim, a diaphragm or a film is also possible.

The woven fabric is preferably formed from fibers which comprise the electrically conductive insulation material, in particular PTFE.

Figure 2:
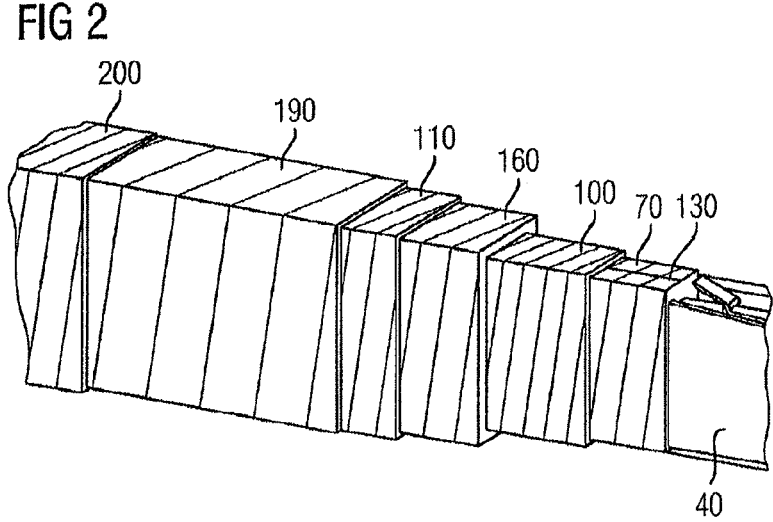
FIG. 2 shows an outer potential grading according to the invention.

This woven fabric is preferably present in tape form and for the application is wound onto the surface to be insulated (see FIG. 2).

A perforated tape (in woven fabric form or the like), a perforated diaphragm or a perforated laid scrim (laid scrim as is known from textile technology) can likewise be used, that is to say through-holes are made in the tape, in the woven fabric, in the diaphragm (which is already porous) or in the laid scrim.

The high-voltage insulation system therefore preferably comprises, in the external corona shielding, fibers or a woven fabric composed of PTFE, wherein there is preferably also an electrically conductive material, preferably graphite, between the woven fabric-forming structures to achieve the electrical conductivity.

The ECS in the high-voltage insulation system in FIG. 2 preferably comprises a woven fabric composed of PTFE, wherein this is structurally designed such that the woven fabric has pores which can be infiltrated as above in accordance with the described process.

The basic design and manner of operation of the current ECS system according to FIG. 1 is intended to remain unchanged in the process, with the exception of the omission of the external corona shielding tape 140 and the replacement of the mica splittings with the PTFE-containing material according to the invention. The external corona shielding winding 200 in FIG. 2 can also be dispensed with.

This yields the following advantages:
good impregnability, since it is a porous woven fabric and can therefore be applied before the curing.
unchanged resistance before and after the impregnation, since the conductivity is attributable to fibers and not to particles as in the case of ECS tape. (These have a different resistance value in comparison to the initial value on account of the polymer matrix enveloping the particles after the impregnation).

The objectives for the ECS-G according to the invention are:
simplified application/cost reduction
reduced layer thickness of the double ECS by thinner alternatives.

The approach for the ECS-G according to the invention is:
reduction of the layer thickness by using a separating layer, which provides defined mechanical decoupling without causing the electrical resistance to change. This is intended to be accomplished by replacing the double layer of mica splittings with hydrophobic types of woven fabric. This may be, in particular, a Teflon material. The structure is made up in the following way:

An improvement is obtained according to the invention by the use of electrically conductive woven fabric 190 composed of PTFE, since this makes the "interweaving" of the external corona shielding tape 140 (FIG. 1) unnecessary. This would make it possible to reduce the layer thickness and the production complexity (FIG. 2).

The structure according to the invention of an innovative outer potential grading for use in the GVPI process allows an insulation system that corresponds to the current state of the art in respect of properties but has the benefits of:
establishing freedom from partial discharges after curing
comparable loss factors after carrying out thermal cycling tests for accelerated thermomechanical loading
comparable long-term electrical stabilities under operational voltage loading and with increased voltage loading
comparable long-term electrical stabilities under operational voltage loading and with increased voltage loading after artificial aging in different thermal cycles.

These investigations were carried out on generator winding bars with the following design:
aluminum profiles with a length of approximately 1.5 m and dimensions of 1 cm×5 cm
number of layers of mica 8+1 layer of IPC for a rated voltage of 13.8 kV
number of generator winding bars per collective: 6.

In this case, a reduction of the layer thickness of the current ECS of approximately 450 µm to a value of about 100 µm was made possible.

Figure 3:
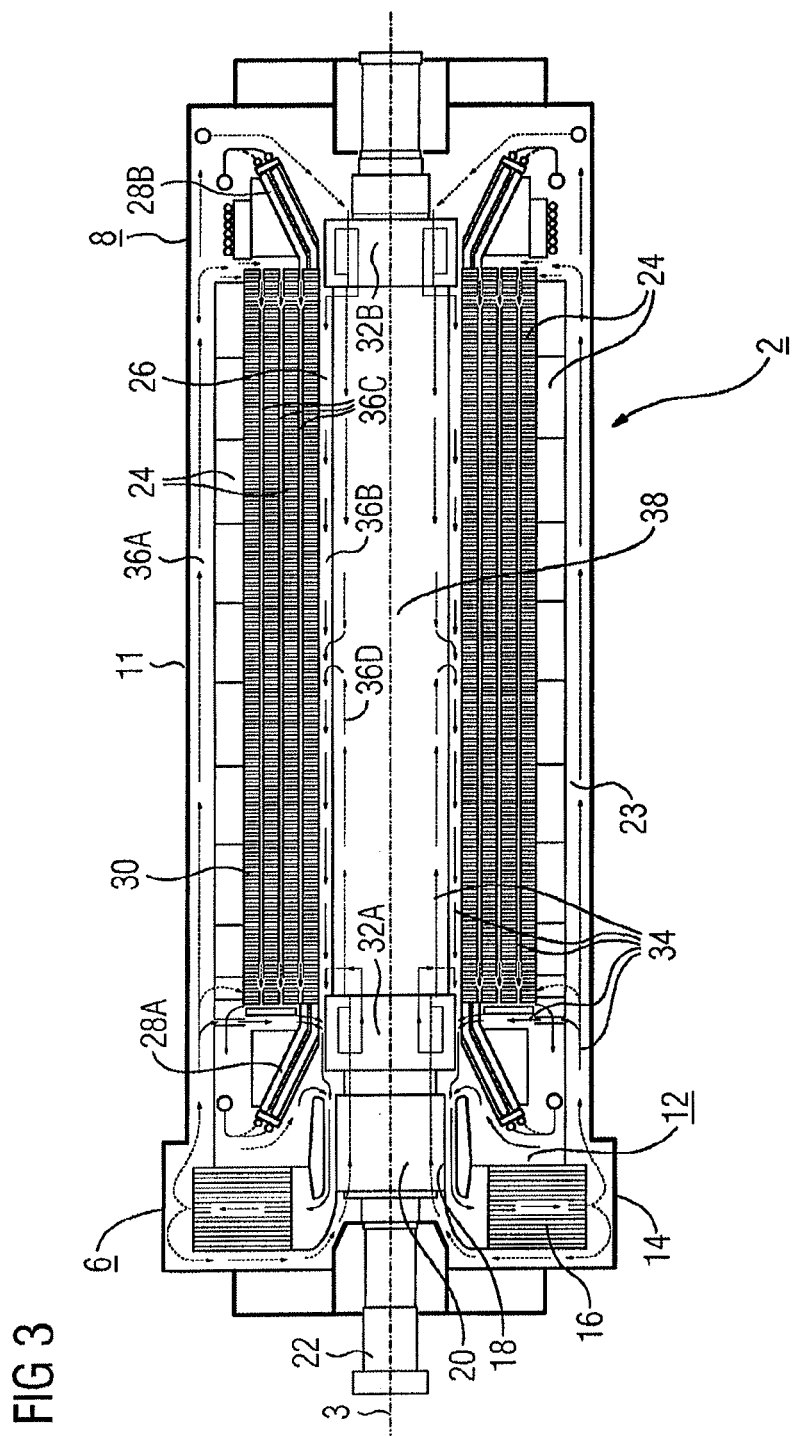
FIG. 3 shows a generator.

FIG. 3 shows, by way of example, a generator as the electrical machine.

According to FIG. 3, a rotary machine arrangement, in particular a generator arrangement 2, extends along a longitudinal axis 3 from a turbine-side end region 6 to an excitation-side end region 8. The generator arrangement 2 has a housing 11. A cooling device 12 is arranged in the turbine-side end region 6. To be precise, two coolers 16 and a compressor in the form of a fan 18 having a fan hub 20 are arranged in a cooler head 14 which is a part of the housing 11. The fan hub 20 is seated on a rotor 22 which extends along the longitudinal axis 3 through the generator arrangement 2. The actual generator region 23 is arranged so as to follow the cooling device 12 in the direction of the longitudinal axis 3. In this region, the rotor 22 is surrounded by a stator 24 such that an air gap 26 is formed. The stator 24 has a stator winding having a turbine-side stator winding overhang 28A and having an excitation-side stator winding overhang 28B. A so-called laminated core 30 is arranged between the two stator winding overhangs 28A, 28B. Analogously to the stator 24, the rotor 22 has a turbine-side rotor winding overhang 32A and an excitation-side rotor winding overhang 32B.

On account of the high power density that is customary in turbogenerators, it is necessary to cool the generator arrangement 2 in the generator region 23. In this case, the stator winding overhangs 28A, 28B and also the rotor winding overhangs 32A, 32B have a particularly high cooling requirement. In order to cool the generator region 23, said generator region has a cooling system 34 which is supplied with cooling gas by the cooling device 12. The cooling system 34 has a number of cooling gas ducts 36A, D, 48 via which the cooling gas is circulated. In this case, a first cooling gas duct 36A extends in the axial direction and is arranged between the stator 24 and the housing 10. A second cooling gas duct 36B is formed by the air gap 26. Further cooling gas ducts 36C which extend in the axial direction lead through the laminated core 30. In order to cool the rotor 22, a cooling gas duct 36D leads through said rotor. The cooling gas flow in the generator region 23 and also in the cooling device 12 is indicated in each case by arrows, wherein the dashed arrows indicate the flow path of the cold cooling gas and the solid arrows indicate the flow path of the heated cooling gas (hot gas).

In order to cool the stator winding overhangs 28A, 28B, the cooling gas flow coming from the coolers 16 is divided in the turbine-side end region 6. One partial flow serves for cooling the turbine-side stator winding overhang 28A and the other partial flow is forwarded via the cooling gas duct 36A to the excitation-side stator winding overhang 28B and divided once again. One part serves for cooling the stator winding overhang 28B and flows back again from there as hot gas via the air gap 26. The other part is conducted through the cooling gas ducts 36C of the laminated core 30 and emerges as hot gas in the turbine-side end region 6 and is fed to the coolers 16. In order to cool the rotor winding overhangs 32A, 32B, cooling gas is introduced into the cooling gas duct 36D of the rotor 22 both from the turbine-side end region 6 and from the excitation-side end region 8. A partial flow of the cooling gas flows through the respective rotor winding overhangs 32A, 32B and is subsequently conducted into the air gap 26 as hot gas and fed to the coolers 16. The remaining partial flow is guided further through the rotor 22 in the cooling gas duct 36D, to be precise in such a way that the cooling gas from the two rotor winding overhangs 32A, 32B flows toward one another and is conducted into the air gap 26 approximately in the central region 38 of the generator region 23.

What is claimed is:

1. An external corona shielding system comprising:
   an inner external corona shielding winding;
   an outer external corona shielding; and
   a perforated tape positioned between the inner external corona shielding winding and the outer external corona shielding, and the perforated tape comprising:
   a woven fabric at least partially composed of fibers comprised of a hydrophobic material, and an electrically conductive material positioned between the fibers, wherein the fibers insulate against conducting electricity between the fibers.

2. The system as claimed in claim 1, wherein the perforated tape comprises electrically conductive PTFE.

3. The system as claimed in claim, 1 wherein the hydrophobic, electrically conductive material of the woven fabric is composed of electrically conductive PTFE.

4. The system as claimed in claim 1, wherein the perforated tape is perforated with perforations shaped, sized and positioned to be infiltrated by a vacuum pressure impregnation process.

5. The system as claimed in claim 1, wherein the hydrophobic material is coated with an electrically conductive layer.

6. The system as claimed in 1, wherein the electrically conductive material comprises graphite.

7. The system as claimed in claim 1, wherein the electrically conductive material is mixed into a hydrophobic material.

8. The system as claimed in claim 1, wherein the electrically conductive material comprises fibers distributed between the fibers or in the woven fabric structure.

9. The insulation system as claimed in claim 1, wherein the hydrophobic material has pores shaped, sized and positioned to be infiltrated by a vacuum pressure impregnation process.

* * * * *